No. 65,920.  PATENTED JUNE 18, 1867.
T. H. LINDLEY.
FILING MACHINE.
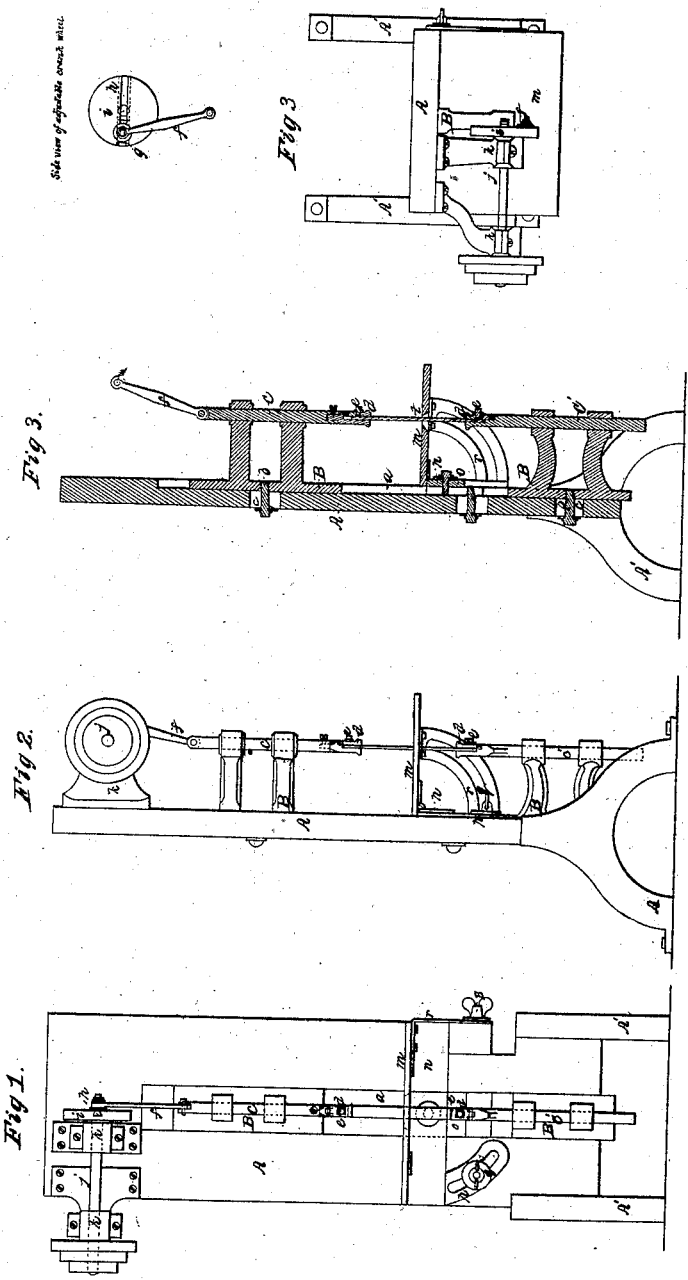
Witnesses.
Francis Curtis
Chas. H. Griffin
Inventor
Thomas H. Lindley.
by his attorney
Fredrick Curtis

United States Patent Office.

THOMAS H. LINDLEY, OF TAUNTON, MASSACHUSETTS.

Letters Patent No. 65,920, dated June 18, 1867.

---

IMPROVED FILING MACHINE.

---

*The Schedule referred to in these Letters Patent and making part of the same.*

---

TO ALL WHOM IT MAY CONCERN:

Be it known that I, THOMAS H. LINDLEY, of Taunton, in the county of Bristol and State of Massachusetts, have invented a new and useful machine for performing the operation of filing pieces of metal or articles of various kinds; and do hereby declare the following to be a full, clear, and exact description thereof, due reference being had to the accompanying drawings, making part of this specification, and in which—

Figure 1 is a front elevation.

Figure 2, a side elevation.

Figure 3, a plan, and

Figure 4 a vertical section of my invention.

The object of this invention is to produce a simple and compact machine for filing, in an expeditious and perfect manner, various small pieces of metal, the labor of which is now performed by hand.

The invention consists in the application, to an upright plate or frame, of two sliding bars or carriages supported in adjustable standards applied to such frame, reciprocating vertical movements being imparted to the sliding carriages by means of a crank or other suitable motor, a suitable operating table being applied to the frame of the machine and between the sliding carriages for supporting the article which is to be filed.

As shown in the accompanying drawings, the machine is composed of an upright plate or tablet, A, supported by suitable legs A' A', having a central groove, a, cut in its front face for receiving the bases of two standards B B, such standards being secured to the plate A by bolts b b passing through them and through slots c c made in the plate, these slots enabling the standards to be raised and lowered, or adjusted with respect to each other in such a manner as to allow files of different lengths to be used. These standards B B support and guide sliding bars or carriages C C', the inner ends of which are formed with jaws d d, provided with clamp-screws e e for securing the ends of the file between them. The upper extremity of the carriage C is jointed to the lower end of a pitman, f, the opposite end of which is pivoted to a dove-tailed head, g, which is inserted within a correspondingly-shaped groove, h, made in the face of a wheel, i, carried by a shaft, j, supported by standards or brackets k k fixed to the plate A, as shown in the drawings, a driving cone-pulley being fixed to the outer end of the shaft j for putting it in rotation. The dove-tailed head g is to be applied to the wheel i by means of a stud and clamp-screw, or any equivalent device for securing it in any desired position, or at any desired distance from the centre of the wheel in order to vary the length of stroke of the file. The adjustable table for supporting the article to be operated upon is shown at m as hinged to a cross-head, n, pivoted to a sliding-block, o, working in the groove a before mentioned, and being attached to the plate A of the machine in the same manner as the standards B B, in order to allow the table to be raised and lowered as occasion may dictate, a sectoral slotted plate, p, being fixed to the cross-head and against the face of the plate A, to which it is connected by a clamp-screw, q, serving to fix the table in at any desired angle transversely with the machine. The movements or angles of the table, in the opposite direction, or longitudinally of the machine, are regulated and controlled by a second sectoral slotted plate, r, fixed to one side of the table, a clamp-screw, s, passing through it and into the outer edge of the cross-head n before mentioned, serving to fix the plate r, and with it the table, in any desired position or angle. An aperture, t, is made through the centre of the table for reception of the file, and to allow of its vertical movements.

In the operation of the above-described machine the article to be filed is to be placed upon the top of the table and in contact with the face of the file, and will, by the reciprocating movements of such file, be reduced to the desired size or shape in a very expeditious and perfect manner, and with much less exertion on the part of the workman than would be the case were it done by hand, the desired angle of cut of the file upon the article being regulated, as before stated, by the position of the table m.

In a machine constructed as above described, and for the special purpose to which it is applied, I claim the combination of the sliding carriages C C', (supported in the adjustable bearings B B, and operated by the wheel i,) and the adjustable table m, supported and applied substantially in manner and for the purpose as set forth.

THOMAS H. LINDLEY.

Witnesses:
 FRANCIS CURTIS,
 CHAS. H. GRIFFIN.